US007925365B2

(12) United States Patent
Chua et al.

(10) Patent No.: US 7,925,365 B2
(45) Date of Patent: Apr. 12, 2011

(54) ROUGH-CUT CAPACITY PLANNING WITH PRODUCTION CONSTRAINTS AND DYNAMIC BOTTLENECK CONSIDERATIONS

(75) Inventors: Tay Jin Chua, Singapore (SG); Feng Yu Wang, Singapore (SG); Wen Jing Yan, Singapore (SG); Tian Xiang Cai, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 1900 days.

(21) Appl. No.: 10/977,393

(22) Filed: Oct. 29, 2004

(65) Prior Publication Data
US 2005/0114202 A1    May 26, 2005

Related U.S. Application Data

(60) Provisional application No. 60/515,427, filed on Oct. 30, 2003.

(51) Int. Cl.
*G06F 19/00* (2006.01)
(52) U.S. Cl. ........................ 700/101; 700/100
(58) Field of Classification Search .................... 700/99, 700/100, 101, 103, 106–107
See application file for complete search history.

(56) References Cited

U.S. PATENT DOCUMENTS

| | | | | |
|---|---|---|---|---|
| 5,950,170 A * | 9/1999 | Pan et al. | ............................ | 705/7 |
| 6,263,253 B1 * | 7/2001 | Yang et al. | ....................... | 700/99 |
| 6,341,240 B1 * | 1/2002 | Bermon et al. | .................. | 700/97 |
| 6,434,446 B1 * | 8/2002 | Schoop et al. | ................. | 700/225 |
| 6,606,527 B2 * | 8/2003 | de Andrade et al. | ............ | 700/97 |
| 6,772,030 B1 * | 8/2004 | Huang | ........................... | 700/103 |
| 6,790,686 B1 * | 9/2004 | Purdy et al. | ...................... | 438/14 |
| 6,801,820 B1 * | 10/2004 | Lilly et al. | ..................... | 700/100 |
| 6,889,106 B2 * | 5/2005 | Wei | ................... | 700/100 |
| 6,978,178 B2 * | 12/2005 | Sommer et al. | ................. | 607/28 |
| 6,978,187 B1 * | 12/2005 | Ryskoski | ....................... | 700/100 |
| 7,089,071 B2 * | 8/2006 | Lilly et al. | ..................... | 700/100 |
| 7,197,469 B2 * | 3/2007 | Hegde et al. | ....................... | 705/8 |
| 2002/0094588 A1 * | 7/2002 | Fan et al. | ......................... | 438/14 |
| 2002/0198616 A1 * | 12/2002 | Crampton et al. | .............. | 700/99 |
| 2002/0198757 A1 * | 12/2002 | Hegde et al. | ....................... | 705/8 |
| 2003/0018503 A1 * | 1/2003 | Shulman | ........................... | 705/7 |

(Continued)

OTHER PUBLICATIONS

Smunt, Rough Cut Capacity Planning in a Learning Environment, IEEE Transactions on Engineering Management, vol. 43, No. 3, Aug. 1996.*

(Continued)

*Primary Examiner* — Albert Decady
*Assistant Examiner* — Darrin Dunn
(74) *Attorney, Agent, or Firm* — Klarquist Sparkman, LLP

(57) ABSTRACT

To assess the sufficiency of a plurality of machines for processing a number of items, machine availability information indicative of availability of the machines for processing the items, machine capacity information indicative of a capacity of each of the machines for processing the items, and machine preference information indicative of a preference of each of the machines for processing the items are obtained. A capacity constraint, such as an upper limit of items to be processed during a time interval, is determined based on the machine availability information, machine capacity information and machine preference information. At least some of the machines are allocated to process at least some of the items based on the machine availability information, machine capacity information and machine preference information, subject to the capacity constraint. The resulting rough-cut capacity plan may be used to balance available capacity against required capacity.

13 Claims, 11 Drawing Sheets

U.S. PATENT DOCUMENTS

| | | | | |
|---|---|---|---|---|
| 2003/0050817 A1* | 3/2003 | Cargille et al. | | 705/8 |
| 2003/0050870 A1* | 3/2003 | Cargille et al. | | 705/28 |
| 2003/0130756 A1* | 7/2003 | Baweja et al. | | 700/100 |
| 2004/0117048 A1* | 6/2004 | Wei | | 700/100 |
| 2004/0117227 A1* | 6/2004 | Wei | | 705/7 |
| 2005/0096769 A1* | 5/2005 | Bayoumi et al. | | 700/99 |
| 2005/0149219 A1* | 7/2005 | Lilly et al. | | 700/100 |
| 2006/0271222 A1* | 11/2006 | Lilly et al. | | 700/100 |

OTHER PUBLICATIONS

N. A. Bakke et al., The Challenges of Capacity Planning, International Journal of Production Economics, 1993, vol. 30-31, pp. 243-264.

J. C. Wortman et al., A Review of Capacity Planning Techniques within Standard Software Packages, Production Planning & Control, 1996, vol. 7, No. 2, pp. 117-128.

* cited by examiner

FIG. 10

| 1000 ↘ | MC001 | MC002 | MC003 | MC004 | MC005 |
|---|---|---|---|---|---|
| PkgA28~MAX | | | | | |
| PkgA28 | SP2:<br>JOB STATUS<br>ASSIGNED Qty: 26250<br>BALANCE Qty: 27750<br>MACHINE STATUS<br>CONSUMED: 105 hrs<br>NUM OF m/c: 1<br>BALANCE TIME: 0 | SP4:<br>JOB STATUS<br>ASSIGNED Qty: 16250<br>BALANCE Qty: 11500<br>MACHINE STATUS<br>CONSUMED: 65 hrs<br>NUM OF m/c: 0.62<br>BALANCE TIME: 0 | SP1:<br>JOB STATUS<br>ASSIGNED Qty: 9500 ―1004<br>BALANCE Qty: 0 ―1002<br>MACHINE STATUS ―1006<br>CONSUMED: 31.67 hrs ―1012<br>NUM OF m/c: 0.3 ―1014<br>BALANCE TIME:73.33hrs ―1016<br>―1010 | SP5:<br>JOB STATUS<br>ASSIGNED Qty: 11500<br>BALANCE Qty: 0<br>MACHINE STATUS<br>CONSUMED: 46 hrs<br>NUM OF m/c: 0.44<br>BALANCE TIME: 59 hrs | |
| PkgA32 | | | SP7:<br>JOB STATUS<br>ASSIGNED Qty: 15250<br>BALANCE Qty: 0<br>MACHINE STATUS<br>CONSUMED: 50.83hrs<br>NUM OF m/c: 0.48<br>BALANCE TIME: 22.5hrs | SP6:<br>JOB STATUS<br>ASSIGNED Qty: 14750<br>BALANCE Qty: 15250<br>MACHINE STATUS<br>CONSUMED: 59 hrs<br>NUM OF m/c: 0.56<br>BALANCE TIME: 0 | |
| PkgB28 | | SP3:<br>JOB STATUS<br>ASSIGNED Qty: 1000<br>BALANCE Qty: 0<br>MACHINE STATUS<br>CONSUMED: 40 hrs<br>NUM OF m/c: 0.38<br>BALANCE TIME: 65 hrs | | | |

1102

SHARED CAPACITY SUMMARY REPORT BY PRODUCT

CP REVISION #12
MACHINED ALLOCATION PREFERENCE: #1
WORK WEEK: 5
START DATE: 29/01/2001
END DATE: 02/02/2001

OPERATION NAME: OPERATION 110

| PART ID | ORDER Qty | SHARED MAX CAP | FINAL STATUS | | | |
|---|---|---|---|---|---|---|
| | | | ALLOCATED M/C | ASSIGNED Qty | BALANCE M/C | BALANCE Qty |
| PkgA28~MAX | 9500 | 31500 | 0.3 | 31500 | 0.22 | 0 |
| PkgA28 | 54000 | 131250 | 2.06 | 54000 | 1.22 | 0 |
| PkgA32 | 30000 | 131250 | 1.04 | 30000 | 1.22 | 0 |
| PkgB28 | 10000 | 131250 | 0.38 | 10000 | 1.22 | 0 |

1104

SHARED CAPACITY SUMMARY REPORT BY MACHINE

CP REVISION #12
MACHINE ALLOCATION PREFERENCE: #1
WORK WEEK: 5
START DATE: 29/01/2001
END DATE: 02/02/2001

OPERATION NAME: OPERATION 110

| MACHINE ID | PART NUMBER | TIME CONSUMED | Qty SATISFIED | REF SETTING | BALANCE NUM OF m/c | BALANCE TIME |
|---|---|---|---|---|---|---|
| MC001 | PkgA28 | 105 | 26250 | DP | 0 | 0 |
| MC002 | PkgB28 | 40 | 10000 | DP | 0 | 0 |
| MC002 | PkgA28 | 65 | 16250 | SP | 0 | 0 |
| MC003 | PkgA28~MAX | 31.67 | 9500 | MUST | 0.22 | 22.5 |
| MC003 | PkgA32 | 50.83 | 0.38 | NP | 0.22 | 22.5 |
| MC004 | PkgB28 | 46 | 11500 | SP | 0 | 0 |
| MC004 | PkgA32 | 59 | 14750 | SP | 0 | 0 |
| MC005 | - | . | . | . | 1 | 105 |

FIG. 11

ROUGH-CUT CAPACITY PLANNING WITH PRODUCTION CONSTRAINTS AND DYNAMIC BOTTLENECK CONSIDERATIONS

CROSS REFERENCE TO RELATED APPLICATIONS

The present application claims the benefit of prior provisional application Ser. No. 60/515,427 filed Oct. 30, 2003, the contents of which are hereby incorporated by reference hereinto.

FIELD OF THE INVENTION

The present invention generally relates to the field of rough-cut capacity planning. More particularly, the invention is concerned with rough-cut capacity planning which accounts for production constraints and bottlenecks.

BACKGROUND OF THE INVENTION

In a production environment, capacity planning generally refers to the process of predicting future needs for production resources such as machines, labor, and raw materials. Capacity planning can be used to assess whether the production capabilites of a particular production facility are sufficient for executing a Master Production Schedule (MPS), which, if determined to be feasible, may become the input to a Material Requirement Plan (MRP). An MPS is a schedule for processing one or more items for purposes of meeting a demand. For example, an MPS may specify a number of products that should be manufactured on a weekly basis for the next month to meet projected consumer demand. An MRP is a set of requirements for materials which are necessary in order to meet an MPS. For example, an MRP may list the quantity of all components and materials required to fabricate items according to the MPS and the date that the components and materials are required.

Capacity planning is typically performed in stages. Different stages of planning have different objectives and may consider different factors. For example, different time frames may be considered in different stages. A rough long-term plan can be first put in place and then mid- to short-term plans can be implemented accordingly as time progresses. The long-term planning is often referred to as rough-cut capacity planning (RCCP).

Traditionally, the general goal in RCCP is to balance the total available capacity (i.e. the manufacturing capability of a production facility) with the total required capacity demanded by the MPS. What is meant by "balance" is that an attempt is made to match required capacity with available capacity. Insufficient available capacity of a production facility would obviously result in an inability to fulfil the MPS. In this case the user may decide either to increase available capacity or, if possible, to adjust the MPS to reduce required capacity. Excess available capacity would waste resources. In this case, the user may decide to decrease available capacity or adjust the MPS to increase required capacity.

Before considering known RCCP approaches, it is helpful to review basic manufacturing terminology. When a batch of items is to be processed, the processing is typically governed by a "work order". As is known in the art, a work order (also referred to as a "job" or a "lot") describes a set of operations (e.g. cutting, sanding, painting) that is to be performed to process a particular item. Processing may for example comprise the steps necessary for generating a product from raw materials or components. A work order typically includes a due date, i.e., a time by which completion of the work order is needed. A "work center" is a set of one or more machines having similar capabilities on which a particular operation can be completed. For example, in a semiconductor backend assembly environment, a "Wire Bond" work center may contain multiple wire bonders which come from different equipment manufacturers, yet they are all generally capable of completing the wire bonding operation. The terms "work center" and "operation" are sometimes used interchangeably. The term "items" and the term "products" may be used interchangeably herein to refer to units to be processed.

In known RCCP approaches, available capacity $C\_Avail_k$ at a particular work center k is typically estimated using the following formula:

$$C\_Avail_k = T_k U_k E_k$$

$T_k$ refers to the total number of machine hours available at work center k for a chosen planning period or "time horizon" (e.g. a week). $U_k$ refers to the machine utilization ratio for the work center, which is the ratio between total actual operational hours and total available hours. $E_k$ refers to the efficiency of the machines comprising the work center. $E_k$ may be determined by dividing Standard Hours by Hours Work and multiplying by 100. "Standard Hours" refers to the length of time that should be required to set up a given machine or operation and run one item (e.g. a part) through that operation. $U_k$ and $E_k$ are typically estimated for the work center k using historical data.

For example, if a work center k is composed of four machines staffed for two eight-hour shifts, five days a week, then there are 320 total hours of machine time available per week (i.e. $T_k$=320 hours/week). If the operation's machine utilization ($U_k$) and efficiency ($E_k$) are 90% and 95% respectively based on historical statistical data, then the available capacity for the work center (estimated) for one week would be:

$$C\_Avail_k = 320 \text{ hours/week} * 90\% * 95\% = 273.6 \text{ hours/week}$$

This calculation may be repeated for each work center in a production facility, and the smallest value for any work center in the production facility may be used as an estimate of the available capacity for the production facility as a whole.

Obviously, the estimated available capacity as computed above is a very rough figure, in the sense that is based on average historical data. As well, this figure assumes that machines are available throughout their shifts and does not account for any product-specific factors which may exist, such as production constraints or bottlenecks. A bottleneck is a resource whose capacity is less than the demand placed upon it. For example, a bottleneck machine or work center exists where jobs are processed at a slower rate than they are demanded.

There are a number of known approaches to calculating the required capacity. Typical approaches include the Capacity Planning using Overall Factors (CPOF), Bill of Resource (BoR) (also known as Bill of Labor), and Resource Profile approaches.

In the CPOF approach, the total required capacity $C\_Req_t$ for all products to be processed according to an MPS during a particular time period (i.e. time interval) is calculated as follows:

$$C\_Req_t = \Sigma(D_i * t_i)$$

where $D_i$ is the number of units of a particular product i to be produced, $t_i$ is the number of working hours (at one or more work centers) required to process one unit of product i, and wherein the summation is performed for each different product i to be produced.

For example, assume that the master production schedule is as shown in Table 1:

TABLE 1

Master Production Schedule for Time periods T1, T2, and T3

|  | T1 | T2 | T3 |
|---|---|---|---|
| Product X | 50,000 units | 60,000 units | 80,000 units |
| Product Y | 100,000 units | 120,000 units | 80,000 units |

The above MPS indicates that, e.g., during time period T1, which may be a week for example, it is desired to produce 50,000 units of Product X and 100,000 units of product Y.

If the time required to produce products X and Y is as shown in Table 2:

TABLE 2

Time Required to Produce Products X and Y

| Product | Time required to manufacture (based on historical data) |
|---|---|
| Product X | 1 hour/1000 units |
| Product Y | 2 hours/1000 units |

Based on the above, the total (production facility-wide) capacity $C\_Req_t$ required for all products to be produced during, say, time period T1, would be as follows:

$$C\_Req_t = (50{,}000 \text{ units} * 1 \text{ hour}/1000 \text{ units}) +$$
$$(100{,}000 \text{ units} * 2 \text{ hours}/1000 \text{ units})$$
$$= 50 \text{ hours} + 200 \text{ hours}$$
$$= 250 \text{ hours}$$

Similar calculations would yield $C\_Req_t$ values of 300 hours and 240 hours for time periods T2 and T3 respectively.

To estimate the required capacity $C\_Req_k$ at an individual work center k for a given time period, the total workload $C\_Req_t$ for the time period is prorated across work centers using historical workload distribution data. For example, if historical data indicates that, on average, 60% of the time required to manufacture a product (any product) at the production facility in question is spent at a first work center ST1 and the remaining 40% of the time required to manufacture the product is spent at a second work center ST1, then the required capacity at a work center $C\_Req_k$ may be determined as shown in Table 3:

TABLE 3

Capacity Required at Work Centers ST1 and ST2 for Different Time Periods T1, T2 and T3

|  | T1 | T2 | T3 |
|---|---|---|---|
| Capacity required at work center ST1 ($C\_Req_{ST1}$) | 250 hours * 60% = 150 hours | 300 hours * 60% = 180 hours | 240 hours * 60% = 144 hours |
| Capacity required at work center ST2 ($C\_Req_{ST2}$) | 250 hours * 40% = 100 hours | 300 hours * 40% = 120 hours | 240 hours * 40% = 96 hours |

Thereafter, for each work center k, the required capacity $C\_Req_k$ may then be compared against available capacity $C\_Avail_k$ in order to assess whether the MPS is feasible.

The CPOF approach is straightforward. However, this approach does not take into account job-specific factors which may impact negatively upon the accuracy of RCCP. For example, if current product mixes differ from the historical product mixes upon which the "60%-40%" historical workload distribution across work centers is based, required capacity calculated using the CPOF approach may not truly reflect required capacity for the current product mix. The CPOF approach also fails to consider lead-time offsets.

In the BoR approach, it is not assumed that the workload distribution across work centers for a current product mix will necessarily match average historical workload distribution across work centers. Rather, the workload distribution is estimated on a product-by-product basis for each product in the MPS. That is, for each product in the current mix, and for each work center/operation k involved in processing said product, the required capacity $C\_Req_k$ for completing the operation is calculated using the following formula:

$$C\_Req_k = \Sigma(D_i \times L_{ik})$$

where $D_i$ is the quantity of product i to be produced, $L_{ik}$ is the processing rate (e.g. expressed in hours/unit) at work center k for product i, and wherein the summation is performed for each different product i to be processed. This approach takes routing of specific product mixes into consideration.

For example, assuming a master production schedule as shown in Table 1 above and product routings as shown in Table 4:

TABLE 4

Product Routings

|  | First operation | Second operation |
|---|---|---|
| Product X | ST1 | ST2 |
| Product Y | ST1 | ST2 | and further assuming that the time required to complete operations ST1 an ST2 for products X and Y is as shown in Table 5:

TABLE 5

Time Required to Complete Operations ST1 and ST2 for Products X and Y

|  | Product X | Product Y |
|---|---|---|
| Operation ST1 | 0.5 hours/1000 units | 1.4 hours/1000 units |
| Operation ST2 | 0.5 hours/1000 units | 0.6 hours/1000 units | then the required capacity $C\_Req_k$ at a work center k may be determined as shown in Table 6:

TABLE 6

Capacity Required at Work Centers ST1 and ST2 for Different Time Periods T1, T2 and T3

|  | T1 | T2 | T3 |
|---|---|---|---|
| Capacity required at work center ST1 ($C\_Req_{ST1}$) | 50,000 units of product X * 0.5 hours/1000 units + 100,000 units of product Y * 1.4 hours/1000 units = 165 hours | 60,000 units of product X * 0.5 hours/1000 units + 120,000 units of product Y * 1.4 hours/1000 units = 198 hours | 80,000 units of product X * 0.5 hours/1000 units + 80,000 units of product Y * 1.4 hours/1000 units = 152 hours |
| Capacity required at work center ST2 ($C\_Req_{ST2}$) | 50,000 units of product X * 0.5 hours/1000 units + 100,000 units of product Y * 0.6 hours/1000 units = 85 hours | 60,000 units of product X * 0.5 hours/1000 units + 120,000 units of product Y * 0.6 hours/1000 units = 102 hours | 80,000 units of product X * 0.5 hours/1000 units + 80,000 units of product Y * 0.6 hours/1000 units = 88 hours |

Disadvantageously, however, the BoR approach does not consider lead-time offsets.

In the Resource Profile approach, lead-time offsets are taken into account. Each bill of resource is time-phased. For instance, when two operations A and B need to be completed but operation B can only be performed after operation A is completed, operation B will have a lead-time equaling the time required to complete the operation A.

For example, assuming that the time required to complete operations ST1 and ST2 for product X is as shown in the time-phased BoR illustrated in Table 7:

TABLE 7

Time Required to Complete Operations ST1 and ST2 for Product X

|  | T-1 | T |
|---|---|---|
| Operation ST1 | 0.5 hours/1000 units |  |
| Operation ST2 |  | 0.5 hours/1000 units | and assuming that the time required to complete operations ST1 and ST2 for product Y is as shown in Table 8:

TABLE 8

Time Required to Complete Operations ST1 and ST2 for Product Y

|  | T-1 | T |
|---|---|---|
| Operation ST1 | 1.4 hours/1000 units |  |
| Operation ST2 |  | 0.6 hours/1000 units | then the required capacity at work centers ST1 and ST2 for processing product X to execute the MPS of Table 1 would be as shown in Table 9:

TABLE 9

Capacity Required at Work Centers ST1 and ST2 for Producing Product X

|  | T1-1 | T1 | T2 | T3 |
|---|---|---|---|---|
| Capacity required at work center ST1 ($C\_Req_{ST1}$) | 50,000 units of product X * 0.5 hours/1000 units = 25 hours | 60,000 units of product X * 0.5 hours/1000 units = 30 hours | 80,000 units of product X * 0.5 hours/1000 units = 40 hours |  |
| Capacity required at work center ST2 ($C\_Req_{ST2}$) |  | 50,000 units of product X * 0.5 hours/1000 units = 25 hours | 60,000 units of product X * 0.5 hours/1000 units = 30 hours | 80,000 units of product X * 0.5 hours/1000 units = 40 hours | and the required capacity at work centers ST1 and ST2 for processing product Y according to the MPS of Table 1 would be as shown in Table 10:

TABLE 10

Capacity Required at Work Centers ST1 and ST2 for Producing Product Y

|  | T1-1 | T1 | T2 | T3 |
|---|---|---|---|---|
| Capacity required at work center ST1 | 100,000 units of product Y * 1.4 hours/1000 units = 145 | 120,000 units of product Y * 1.4 hours/1000 units = 168 | 80,000 units of product Y * 1.4 hours/1000 units = 112 |  |

TABLE 10-continued

Capacity Required at Work Centers ST1 and ST2 for Producing Product Y

|  | T1-1 | T1 | T2 | T3 |
|---|---|---|---|---|
| ($C\_Req_{ST1}$) | hours | hours | hours | |
| Capacity required at work center ST2 ($C\_Req_{ST2}$) | | 100,000 units of product Y * 0.6 hours/1000 units = 60 hours | 120,000 units of product Y * 0.6 hours/1000 units = 72 hours | 80,000 units of product Y * 0.6 hours/1000 units = 48 hours |

The total required capacity at work centers ST1 and ST2 for processing products X and Y would thus be as shown in Table 11:

TABLE 11

Capacity Required at Work Centers ST1 and ST2 for Producing Products X and Y

|  | T1-1 | T1 | T2 | T3 |
|---|---|---|---|---|
| Capacity required at work center ST1 ($C\_Req_{ST1}$) | 25 hours + 140 hours = 165 hours | 30 hours + 68 hours = 198 hours | 40 hours + 112 hours = 152 hours | |
| Capacity required at work center ST2 ($C\_Req_{ST2}$) | | 25 hours + 60 hours = 85 hours | 30 hours + 72 hours = 102 hours | 40 hours + 48 hours = 88 hours |

The RCCP approaches described above are generally simple to implement and use but they, and other known approaches, have a drawback in that the estimated capacities (both available and required) may not be sufficiently accurate, such that non-feasible production plans may result. For instance, while the rough-cut capacity plan indicates sufficient capacity, short-term capacity shortfalls may still arise. While some degree of discrepancy between a rough-cut capacity plan and a short-term plan may be expected, it is desirable to limit the discrepancy as much as possible.

It is therefore desirable to provide more accurate, feasible and practical RCCP.

SUMMARY OF THE INVENTION

To assess the sufficiency of a plurality of machines for processing a number of items, machine availability information indicative of availability of the machines for processing the items, machine capacity information indicative of a capacity of each of the machines for processing the items, and machine preference information indicative of a preference of each of the machines for processing the items are obtained. A capacity constraint, such as an upper limit of items to be processed during a time interval, is determined based on the machine availability information, machine capacity information and machine preference information. At least some of the machines are allocated to process at least some of the items based on the machine availability information, machine capacity information and machine preference information, subject to the capacity constraint. The resulting rough-cut capacity plan may be used to balance available capacity against required capacity.

In accordance with an aspect of the present invention there is provided a method of assessing the sufficiency of a plurality of machines for processing a number of items, the method comprising: obtaining machine availability information indicative of availability of the machines for processing the items; obtaining machine capacity information indicative of a capacity of each of the machines for processing the items; obtaining machine preference information indicative of a preference of each of the machines for processing the items; determining a capacity constraint based on the machine availability information, the machine capacity information and the machine preference information; and allocating at least some of the machines to process at least some of the items based on the machine availability information, machine capacity information and machine preference information, subject to the capacity constraint.

In accordance with another aspect of the present invention there is provided a method of assessing the sufficiency of a plurality of work centers for processing a plurality of jobs during a time interval, each work center having a group of machines for performing an operation, each job having a job priority and including one or more operations to be performed upon a set of like items, each machine having a preference level for processing the items associated with each job, the preference level being one of a range of machine preference levels, the method comprising: determining which jobs of the plurality of jobs have an operation that is associated with a work center having an available machine whose preference level the current machine preference level having been selected from the range of machine preference levels in decreasing preference order, the determining resulting in a set of candidate jobs; selecting from the set of candidate jobs a job whose job priority is at least as high as the job priority of any other job in the set of candidate jobs, the selecting resulting in a selected job, the items associated with the selected job being referred to as selected items; and at each work center associated with an operation of the selected job, allocating one or more machines having either the current machine preference level or a lower machine preference level in respect of the selected items to process a chosen number of units of the selected items, the allocating of machines being performed in decreasing order of machine preference level in respect of the selected items.

In accordance with yet another aspect of the present invention there is provided a method of assessing sufficiency of a plurality of work centers for processing a plurality of jobs during a time interval, comprising: choosing a machine preference level as a current chosen level, the current chosen level being a highest level of all levels not yet chosen as a chosen level; selecting as a current job a highest priority job of a set of jobs having at least one operation requiring the current chosen level at a work center having an available machine; and allocating machine capacity to the current job across all work centers.

In accordance with yet another aspect of the present invention there is provided a machine-readable medium including code for assessing the sufficiency of a plurality of machines for processing a number of items, comprising: machine-executable code for obtaining machine availability information indicative of availability of the machines for processing the items; machine-executable code for obtaining machine capacity information indicative of a capacity of each of said machines for processing the items; machine-executable code for obtaining machine preference information indicative of a preference of each of the machines for processing the items; machine-executable code for determining a capacity constraint based on the machine availability information, the machine capacity information and the machine preference information; and machine-executable code for allocating at least some of the machines to process at least some of the items based on the machine availability information, machine capacity information and machine preference information, subject to the capacity constraint.

In accordance with yet another aspect of the present invention there is provided a machine-readable medium including code for assessing the sufficiency of a plurality of work centers for processing a plurality of jobs during a time interval, each work center having a group of machines for performing an operation, each job having a job priority and including one or more operations to be performed upon a set of like items, each machine having a preference level for processing the items associated with each job, the preference level being one of a range of machine preference levels, comprising: machine-executable code for determining which jobs of the plurality of jobs have an operation that is associated with a work center having an available machine whose preference level for processing the items associated with the job matches a current machine preference level, the current machine preference level having been selected from the range of machine preference levels in decreasing preference order, the determining resulting in a set of candidate jobs; machine-executable code for selecting from the set of candidate jobs a job whose job priority is at least as high as the job priority of any other job in the set of candidate jobs, the selecting resulting in a selected job, the items associated with the selected job being referred to as selected items; and machine-executable code for, at each work center associated with an operation of the selected job, allocating one or more machines having either the current machine preference level or a lower machine preference level in respect of the selected items to process a chosen number of units of the selected items, the allocating of machines being performed in decreasing order of machine preference level in respect of the selected items.

In accordance with yet another aspect of the present invention there is provided a machine-readable medium including code assessing sufficiency of a plurality of work centers for processing a plurality of jobs during a time interval, comprising: machine-executable code for choosing a machine preference level as a current chosen level, the current chosen level being a highest level of all levels not yet chosen as a chosen level; machine-executable code for selecting as a current job a highest priority job of a set of jobs having at least one operation requiring the current chosen level at a work center having an available machine; and machine-executable code for allocating machine capacity to the current job across all work centers.

In accordance with yet another aspect of the present invention there is provided a computing device comprising a processor and persistent storage memory in communication with the processor storing machine readable instructions for directing the device to assess the sufficiency of a plurality of machines for processing a number of items, the device comprising: means for obtaining machine availability information indicative of availability of the machines for processing the items; means for obtaining machine capacity information indicative of a capacity of each of the machines for processing the items; means for obtaining machine preference information indicative of a preference of each of the machines for processing the items; means for determining a capacity constraint based on the machine availability information, the machine capacity information and the machine preference information; and means for allocating at least some of the machines to process at least some of the items based on the machine availability information, machine capacity information and machine preference information, subject to the capacity constraint.

In accordance with yet another aspect of the present invention there is provided a computing device comprising a processor and persistent storage memory in communication with the processor storing machine readable instructions for directing the device to assess the sufficiency of a plurality of work centers for processing a plurality of jobs during a time interval, each work center having a group of machines for performing an operation, each job having a job priority and including one or more operations to be performed upon a set of like items, each machine having a preference level for processing the items associated with each job, the preference level being one of a range of machine preference levels, the device comprising: means for determining which jobs of the plurality of jobs have an operation that is associated with a work center having an available machine whose preference level for processing the items associated with the job matches a current machine preference level, the current machine preference level having been selected from the range of machine preference levels in decreasing preference order, the determining resulting in a set of candidate jobs; means for selecting from the set of candidate jobs a job whose job priority is at least as high as the job priority of any other job in the set of candidate jobs, the selecting resulting in a selected job, the items associated with the selected job being referred to as selected items; and means for, at each work center associated with an operation of the selected job, allocating one or more machines having either the current machine preference level or a lower machine preference level in respect of the selected items to process a chosen number of units of the selected items, the allocating of machines being performed in decreasing order of machine preference level in respect of the selected items.

In accordance with yet another aspect of the present invention there is provided a computing device comprising a processor and persistent storage memory in communication with the processor storing machine readable instructions for directing the device to assess sufficiency of a plurality of work centers for processing a plurality of jobs during a time interval, the device comprising: means for choosing a machine preference level as a current chosen level, the current chosen level being a highest level of all levels not yet chosen as a chosen level; means for selecting as a current job a highest priority job of a set of jobs having at least one operation requiring the current chosen level at a work center having an available machine; and means for allocating machine capacity to the current job across all work centers.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate an exemplary embodiment of this invention:

FIG. 10 is a schematic diagram illustrating an exemplary machine allocation map associated with a work center of FIG. 1; and FIG. 11 illustrates exemplary reports that may be generated by an RCCP system as described herein.

DETAILED DESCRIPTION

Figures 1, 2:
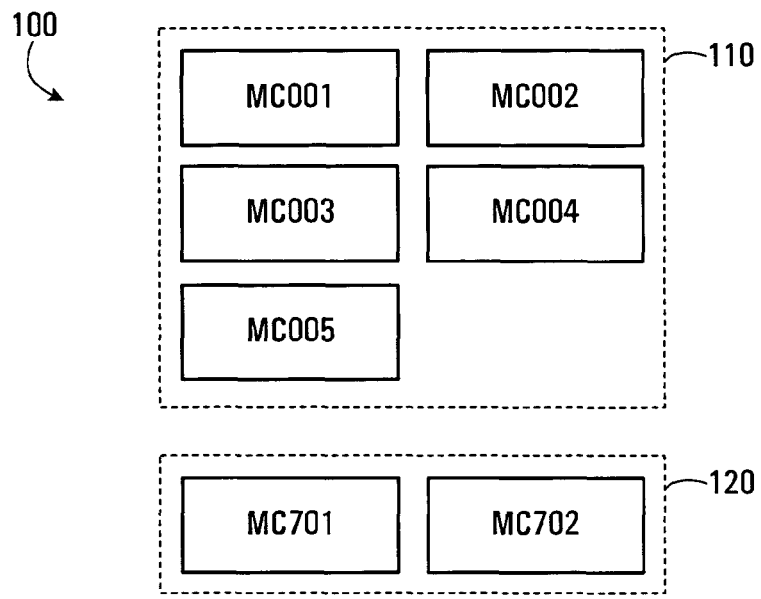
FIG. 1 illustrates a production facility in respect of which RCCP is being performed.
FIG. 2 illustrates a master production schedule (MPS) for which feasibility is being assessed using RCCP.

Referring to FIG. 1, a production facility 100 having two work centers 110 and 120 is shown. Each work center 110 and 120 is a set of machines having similar capabilities on which a particular operation can be completed. The operation that a work center is capable of completing is referred to herein using the same reference numeral as is used for the work center. Thus, work center 110 has five machines MC001, MC002, MC003, MC004 and MC005, each capable of performing operation 110, and work center 120 has two machines MC701 and MC702, each capable of performing operation 120.

FIG. 2 illustrates a Master Production Schedule (MPS) 200. An MPS is a schedule identifying one or more sets of items to be processed during a particular time interval for purposes of meeting a demand. The MPS 200 pertains to a particular planning interval, which in the present example is a one-week period ("week 6" of a production year). In the present example, the sets of items to be processed identified in MPS 200 can be processed using machines at the work centers 110 and 120 of production facility 100 (FIG. 1).

MPS 200 has four rows 200-1, 200-2, 200-3 and 200-4 and two columns 200-A and 200-B. Each of the four rows 200-1, 200-2, 200-3 and 200-4 is associated with or defines a job. Each job has an identifier, which is indicated in column 200-A, and specifies a number of items of a certain type, which is indicated in column 200-B, that should be processed during the relevant time interval (week 6) in order to meet a demand. Thus, for example, it may be seen that during week 6, it is desired to process 9,500 units of the item having identifier PkgA28~MAX; 54,0000 units of the item having identifier PkgA28; and so forth. It is noted that the identifiers in column 200-A, i.e., PkgA28~MAX, PkgA28, PkgA32, and PkgB28, are in the present example part IDs which identify the name of a part (item) to be processed to complete the associated job. In the present description, job names and corresponding item names (i.e. item identifiers) are referred to interchangeably. Each job may additionally specify the set of operations that must be performed to process the relevant item (not illustrated). In the present example, it is assumed that each job represented in MPS 200 job requires processing of the relevant items at both of work centers 110 and 120 (i.e. each job requires both operations 110 and 120 to be performed). In alternative embodiments, different jobs may entail different sets of operations/work centers.

MPS 200 may be generated from a customer forecast 202, which is simply a form of master production schedule in which orders for like items for the are not yet consolidated. In MPS 200, orders for like items are consolidated (either for a single customer, e.g. job PkgA28~MAX of FIG. 2 (for customer "MAX"), or across different customers, e.g. job PkgA28), thus MPS 200 may be referred to as a "consolidated forecast". Consolidation is illustrated by arrows 204 and 206.

Figure 3:
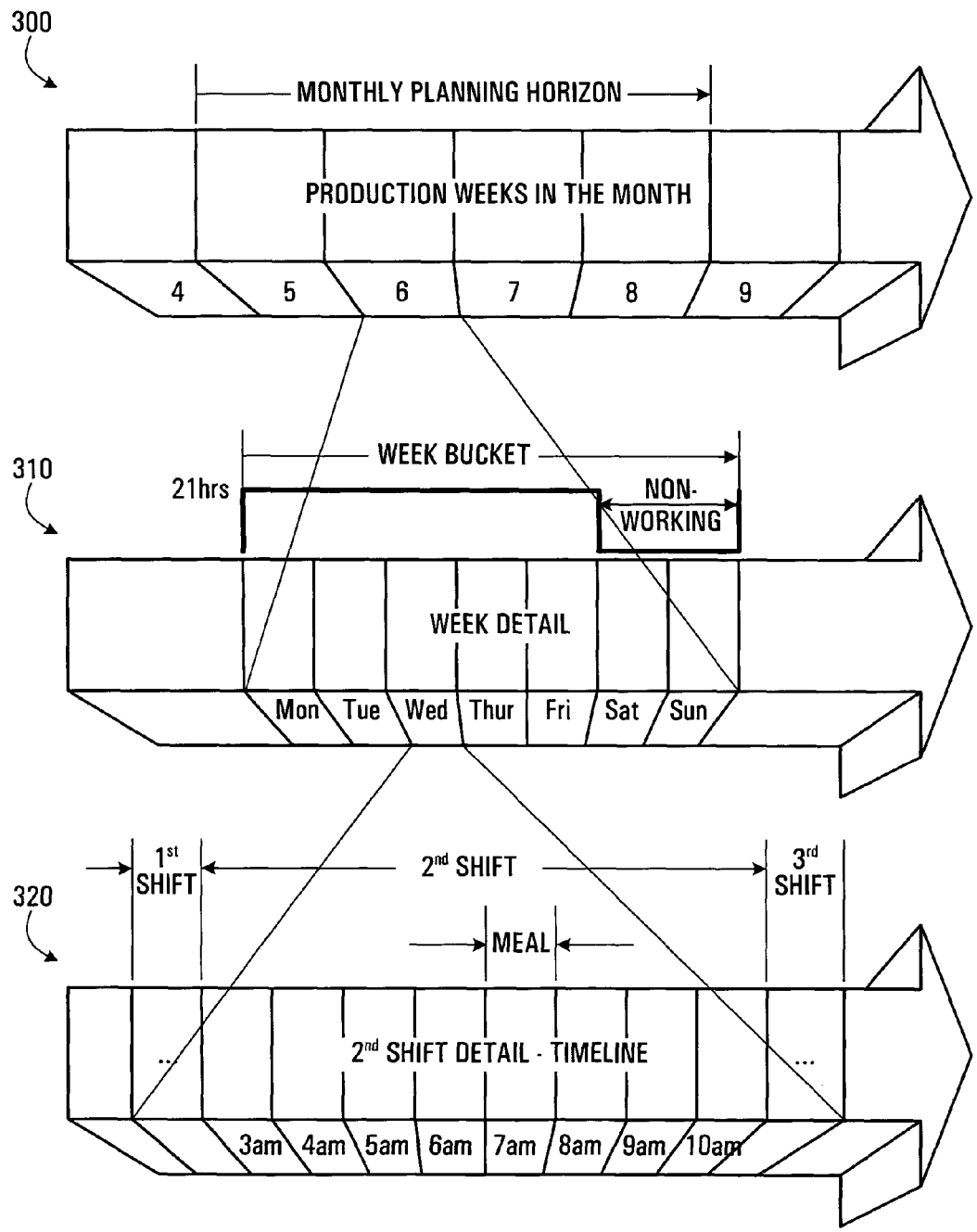
FIG. 3 illustrates production calendar information maintained for an exemplary machine.

FIG. 3 illustrates time lines which may be maintained for each machine at each work center to reflect machine scheduling and to determine machine availability. Three time lines 300, 310, and 320 are illustrated for an exemplary machine MC001. The time lines 300, 310, and 320 illustrate the availability of machine MC0001 in progressively finer levels of granularity. Time line 300 illustrates the availability of MC001 on a week-to-week basis for a given production year. Time line 310 illustrates the availability of MC001 on a day-to-day basis for a given week—in this case, week 6 of the production year. Time line 320 illustrates the hour-to-hour availability of MC001 during a particular shift on Wednesday of week 6. It will be appreciated that maintaining timelines representing higher levels of granularity (e.g. timelines 300 and 310) may not be necessary so long as timelines for the finest level of granularity required (e.g. timeline 320) are maintained; however, maintenance of timelines having higher levels of granularity may facilitate specification of non-working periods (e.g. holidays or weekends) which are applicable to all timelines at a lower level of granularity. Alternatively, all levels of granularity can be represented in a single time line per machine. At the finest level of granularity, each timeline may constitute a sequence of contiguous time slots, each time slot representing a minimum amount of time (e.g. one hour) for which the associated machine may be allocated to process items for a particular job. In the present example, time slots of one hour are illustrated; however, the minimum time slot increment may be smaller in other embodiments (e.g. minutes).

It is noted that timelines may be represented in software in various ways (e.g. as a linked list or matrix for example). Timelines may be referred to more generally as "machine availability information". As well, it is noted that a calendar may be defined so as to be universally applicable to the entire production facility, work center or machine (e.g. to facilitate definition of universal down times such as holiday shutdowns).

Figure 4:
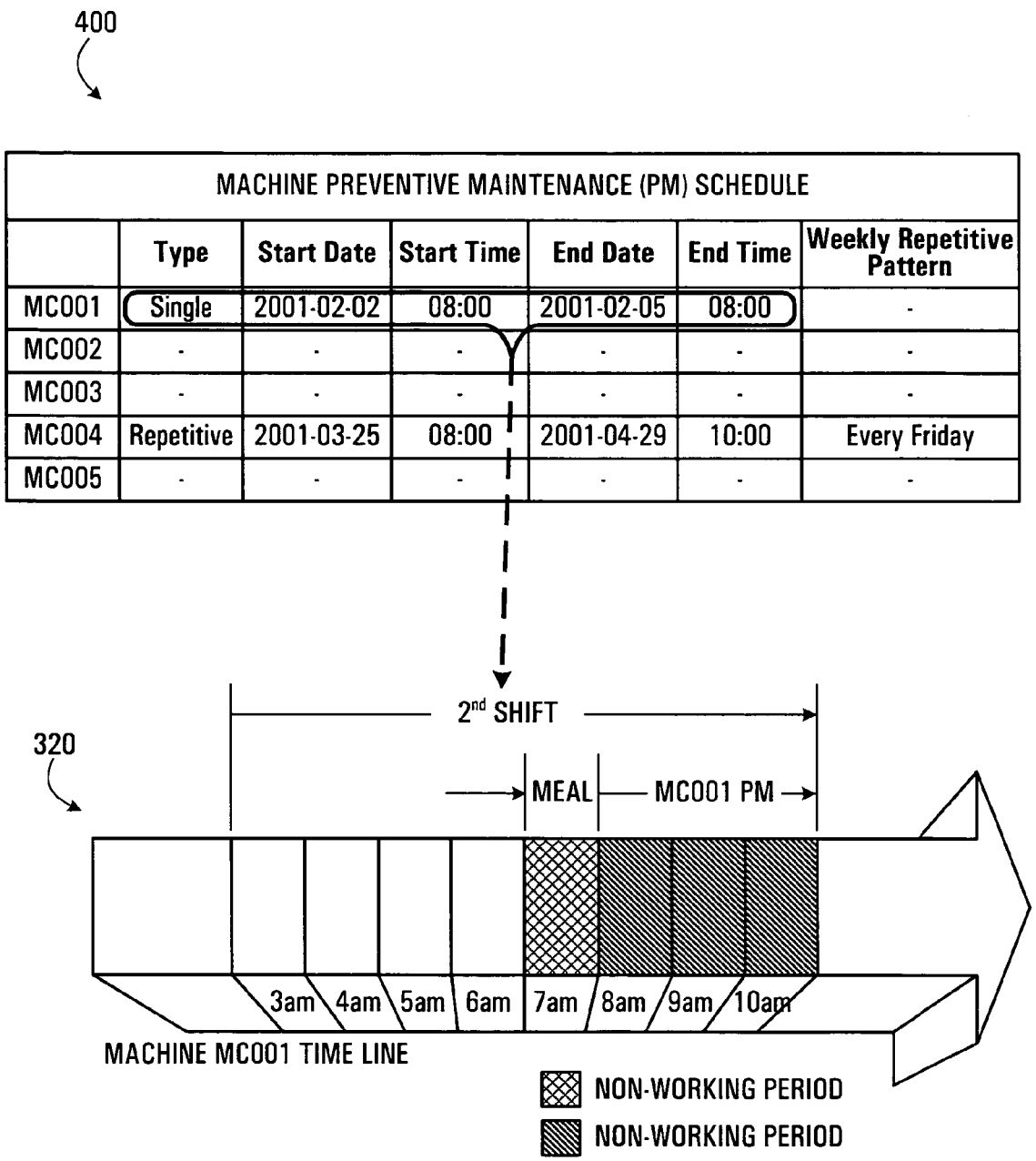
FIG. 4 illustrates a machine time line indicative of machine availability maintained for an exemplary machine.

FIG. 4 illustrates the manner in which a preventative maintenance (PM) schedule 400 and other factors may impact availability for a particular machine MC001. As illustrated, the PM schedule 400 indicates that machine MC001 is to have preventative maintenance starting at 8:00 AM. on date 2001 Feb. 2 and ending at 8:00 AM on date 2001 Feb. 5. As a result, the timeline 320 for MC001 on date 2001 Feb. 2 will indicate that the machine is unavailable after 8:AM. The availability of a particular machine may also be affected by other factors, such as whether or not the day in question is a holiday, whether or not the day in question is a weekend day, and whether or not the hour in question is a scheduled meal break. For example, machine MC001 is not available during the one hour time interval from 7:00 to 8:00 AM, as this is a scheduled meal time. Timeline 320 will also reflect allocation of the machine MC001 for processing various jobs represented in the MPS 200 of FIG. 2. As jobs are allocated to machine MC001, the amount of available time on the machine MC001 will be dynamically diminished.

It will be appreciated that machine times lines similar to timeline 320 are maintained not just for MC001, but also for every other machine in production facility 100, i.e., MC002, MC003, MC004, MC005, MC701 and MC702.

Figure 5:
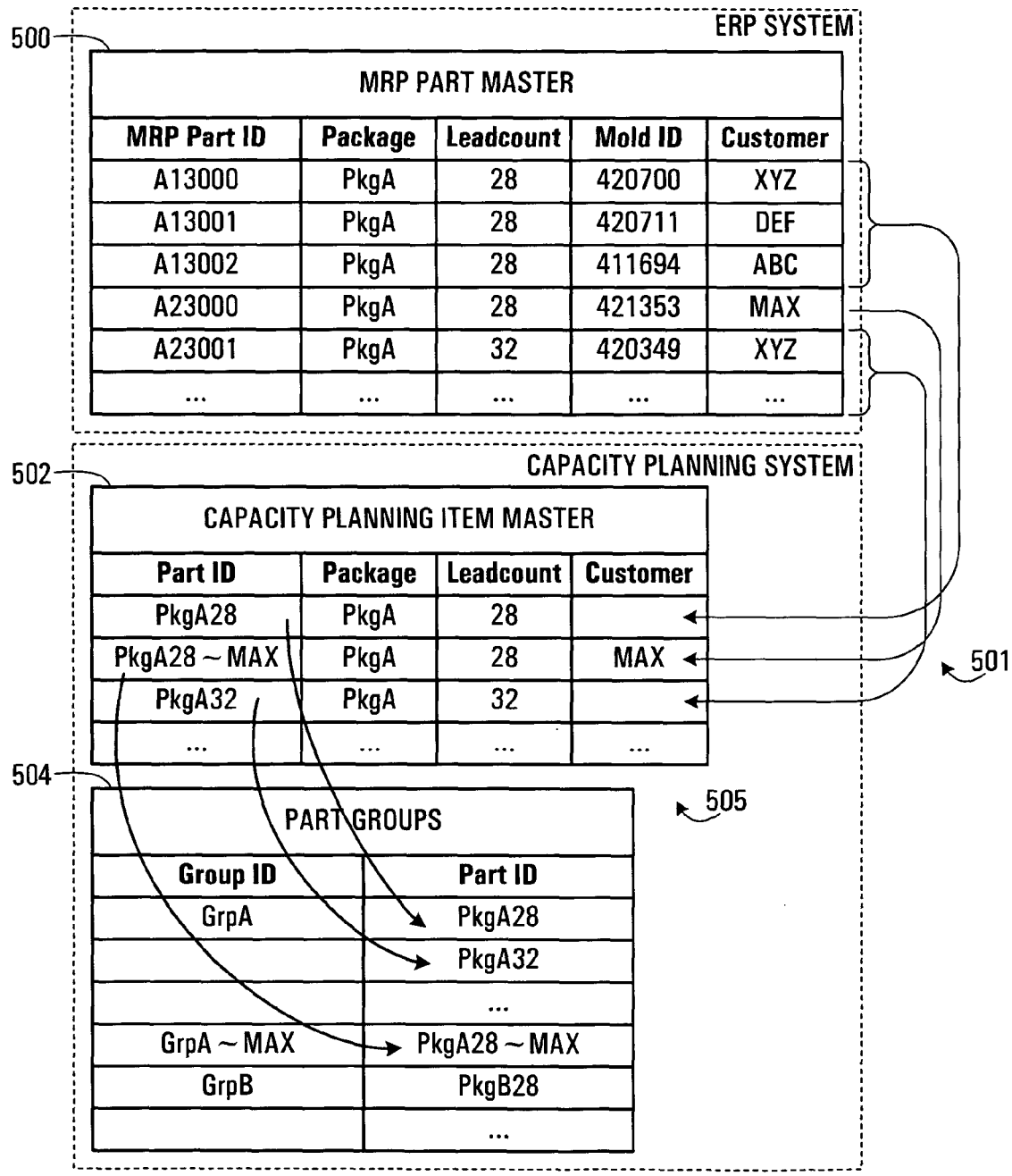
FIG. 5 illustrates the aggregation of items for rough-cut capacity planning purposes.

FIG. 5 illustrates a capacity planning item master 502. Capacity planning item master 502 identifies the different items for which RCCP may be performed. As illustrated, master 502 may be generated by mapping or aggregating parts identified in a material requirements plan (MRP) parts master 500, which may be maintained by an enterprise resource planning (ERP) system, to the capacity planning item master 502. RCCP is often based on such aggregation of product attributes, as demands for specific products may be unavailable at the RCCP stage. Mapping is represented by arrows 501. In particular, if certain characteristics of parts listed in the MRP parts master 500 are the same between parts (e.g. in the case of integrated circuits, if different parts have the same package or lead count), the parts may be grouped together in the capacity planning item master 502. For example, referring to FIG. 5, parts A13000, A13001, and A13002 of MRP parts master 500 are mapped to the same aggregate item identifier (PkgA28) in the capacity planning item master 502 because they share the same attributes, namely package and lead count. In contrast, part A23000 is not mapped to the same item identifier even through it has the same attributes as the parts mapped to part PkgA28. Rather, it is mapped to item identifier (PkgA28~MAX) because it is a "special" part that comes from a key customer (i.e. MAX) which has special delivery lead-time, dedicated machines or other special production criteria that are to be met. Mapping may be performed automatically, with a user-selected naming convention being operative for generating Part IDs in the master 502. For example, as illustrated in FIG. 5, the names of the Part IDs in master 502 are generated from the Package and Leadcount from the MRP part master 500, with an optional appended "~" and customer ID for jobs with special, customer-specific criteria.

Items from the capacity planning item master 502 created as a result of the mapping process can be further grouped into groups 504 as illustrated by arrows 505 based on detailed production constraints. For example, part PkgA28 and PkgA32 may be grouped to form a group named GrpA because they share the same machine allocation preferences (described below).

Figure 6:
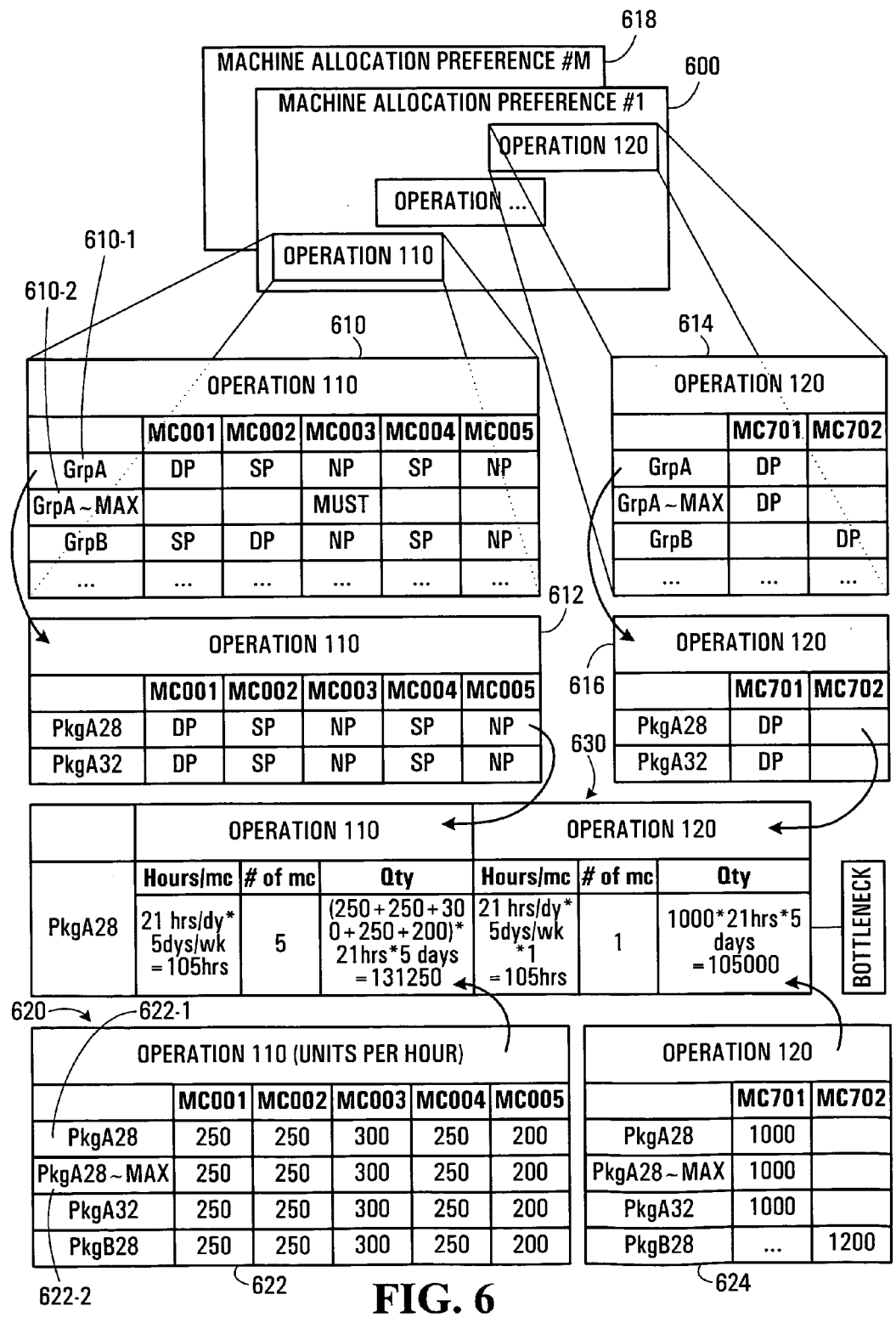
FIG. 6 illustrates machine allocation preference matrices, bottleneck computation, and matrices indicating the capacity of individual machines to process specified items.

FIG. 6 illustrates various types of information maintained for purposes of performing rough-cut capacity planning (RCCP) according to an embodiment of the present invention. The maintained information includes a set of machine allocation preferences 600 and machine capacity matrices 620.

The set of machine allocation preferences 600 specifies machine preference levels for each machine of production facility 100 (FIG. 1) for each item to be processed. Because each work center 110, 120 includes multiple machines, and because different machines at a work center may have different capabilities while generally being capable of performing the operation with which the work center is associated, each machine may be more preferable or less preferable (i.e. more suitable or less suitable) for processing a particular item. Within the set of machine allocation preferences 600, the preference (or suitability) for each machine for processing each item is reflected by way of a machine preference level. Machine preference levels may be thought of as "suitability categories" representing the suitability of a machine for processing a particular item. Machine preference levels, which are sometimes referred to as "machine loading preferences", are maintained for each machine for each of the items to be processed. In the present embodiment, five different preference levels exist: (1) Must—identifies machines that must be used for the current operation for reasons such as better throughput, tooling constraints, quality issues, and the like; (2) Dedicated Preferred (DP)—identifies machines that, although not mandatory, are preferred for completing the current operation; (3) Shared Preferred (SP)—identifies machines that are preferred for completing the current work order operation but not as preferable as DP machines; (4) No-Preference (NP)—identifies machines that can be used to complete the current work order operation but should only be used if no DP or SP machines are available; and (5) Must Not—identifies machines that must not be used for the current work order operation. In practice, these preference levels may be represented numerically, e.g. as an integer with a value of 0-4, with the magnitude of the integer corresponding to a level of preference for processing the relevant item with the current machine. Various other preference level implementation techniques would be apparent to those skilled in the art.

As shown in FIG. 6, the set of machine allocation preferences 600 includes a first matrix 610 representing machine preference levels for each machine of work center 110 and a second matrix 614 representing machine preference levels for each machine of work center 120, for each item to be processed. In the illustrated embodiment, the items to be processed have been grouped based on equivalence of machine allocation preferences. For example, referring to the first row 610-1 of matrix 610, machine preference levels have been specified for items in group GrpA. The items comprising group GrpA, i.e. PkgA28 and PkgA32, are specified in an associated matrix 612. As shown in matrix 612, the same preference levels have been specified for each item in the group GrpA for each machine of work center 110. That is, member of the same group share the same machine preferences. Specifically, machine MC001 is identified as the most preferred machine for performing operation 110 for either of items PkgA28 or PkgA32. If machine MC0001 is not available, then machines MC002 and MC004 are equally preferable as a first alternative. If none of those machines is available, either of machines MC003 and MC005 would be the next choice. Moreover, it may be possible to vary an individual group member's preferences from the group preferences of the group to which the member belongs, by specifying the variations at the member level.

For clarity, it is noted that empty cells in matrix 610 of the present embodiment represent "Must Not" machines. For example, the empty cells corresponding to machine MC001, MC002, MC004 and MC005 within the matrix 610 indicate that those machines are not to be used to process item GrpA~MAX.

Matrices 614 and 616, which pertain to work center 120, are analogous to matrices 610 and 612.

For purposes of "what-if" simulation, it is possible to maintain an alternative set of machine allocation preferences 618 (or more than one alternative set of preferences). This may facilitate the execution of RCCP in multiple runs with different preferences, with a view to identifying an optimal planning solution.

Machine capacity matrices 620 of FIG. 6 includes matrices 622 and 624 indicating the processing rate (in units per hour) of individual machines at work centers 110 and 120 respectively for each item to be processed. For example, the first row 622-1 of matrix 622 provides processing rates for item PkgA28, indicating that machines MC001, MC002 and MC004 are each capable of processing 250 units/hour of that item; machine MC003 is capable of processing 300 units/hour of that item; and machines MC005 is capable of processing only 200 units/hour of that item. As will be appreciated, machine capacity matrices 620 is used during RCCP in order to convert a machine's available time into a corresponding number of units of a particular item which can be processed during that available time, which aids in the determination of processing bottlenecks.

Further illustrated in FIG. 6 is a computation 630 for determining a bottleneck number of units that the production facility 100 is capable of producing due to a limitation in processing capacity at one or more of the machines of work centers 110 and 120. Operation for computing bottlenecks will be described in detail later.

Figure 7:
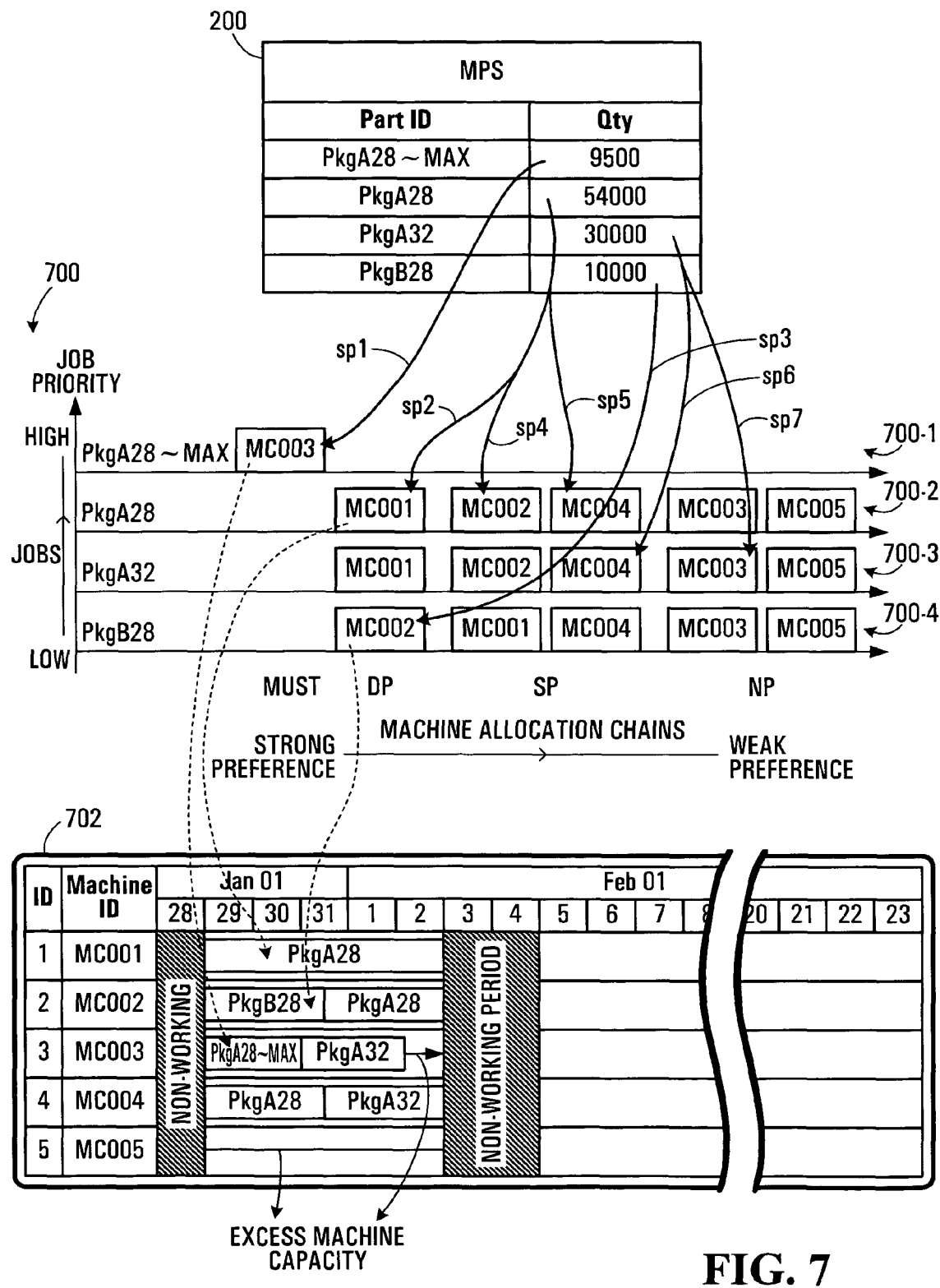
FIG. 7 illustrates an MPS, machine allocation chains, and allocation result associated with the RCCP performed by the present embodiment.

FIG. 7 illustrates a machine allocation chain matrix 700 which is generated for purposes of RCCP. A machine allocation chain matrix is a matrix in which jobs are arranged in order of job priority and in which, for each job, preferred machines are arranged in order of machine preference level. "Job priority" is defined to be the priority assigned to a job on the basis of, e.g., item priority and customer importance. For example, jobs may first be sorted based on item priority, with customer priority being used to break any "ties". Alternatively, job priority may be assessed solely by item priority (in which case job priority could be referred to as "item (or product) loading priority". The rationale for assigning a job priority is to allow high priority jobs to be identified and planned for resource allocation before low priority jobs.

In FIG. 7, jobs in the illustrated matrix 700 are ordered from top to bottom in decreasing order of job priority. For each job, machines capable of processing the items associated with the job are listed on the horizontal axis from left to right, in decreasing order of machines preference level for processing the relevant item (this being referred to as a "machine allocation chain" for that job). As will be appreciated, the arrangement of jobs in decreasing job priority and machines in decreasing machine preference level order within machine allocation chain matrix 700 facilitates operation for performing RCCP.

Also illustrated in FIG. 7 are MPS 200 (described above) and machine allocation result 702, which shows allocation of machines to jobs upon completion of RCCP.

In overview, the objective of RCCP as performed in the present embodiment is to assess, across all of work centers 110 and 120 necessary for processing the items identified in the MPS 200 for a particular planning time interval, how the available capacity at the work center machines—taking into account machine availability, capacities of individual machines for the items to be processed, machine preferences for the items to be processed, and the job priorities associated with those items based on, e.g., item priority and customer importance—compares with the required capacity as dictated by the desired number and types of items in MPS 200 for the time interval in question. The idea is to perform RCCP in a manner which more closely resembles actual scheduling of work orders than in conventional RCCP approaches. That is, machines at required work centers are allocated to process items for the planning time interval in question, in order to determine with more confidence whether or not the production facility truly has the capacity to process the items in question. The customer's requirements are thus taken into consideration, yet at the same time the "realities of the shop floor" are also taken into consideration.

Generally, operation by which RCCP is performed may be described as three nested loops. In first (outermost) loop, a current machine preference level is set, starting with the highest machine preference level and then decreasing the level after each iteration (MUST, DP, SP, etc.). In a second (nested) loop, a current job is selected based on decreasing job priority level and based on whether or not a machine preference level matching the current machine preference level has been specified for the item associated with the job at any machine at any work center needed to process the item. In a third (innermost) loop, machine capacity of one or more machines having the current machine preference level or a lower machine preference level for the item associated with the current job is allocated across all required work centers. Capacity allocation is performed on the basis of a computed "bottleneck" number of items, which may be less than the number of items that is desired to be processed during the current time interval. The bottleneck number represents the number of units of the current item that can be processed at every work center required to process the item, due to limitations (e.g. a limited processing rate of a machine for processing the current item or limited machine availability due to scheduled down time or previous allocation to higher job priority items) at (at least) one of the work centers required to process that item. The bottleneck is recomputed each time the innermost loop is executed, to account for any allocations performed during the previous loop iteration.

Figure 8:
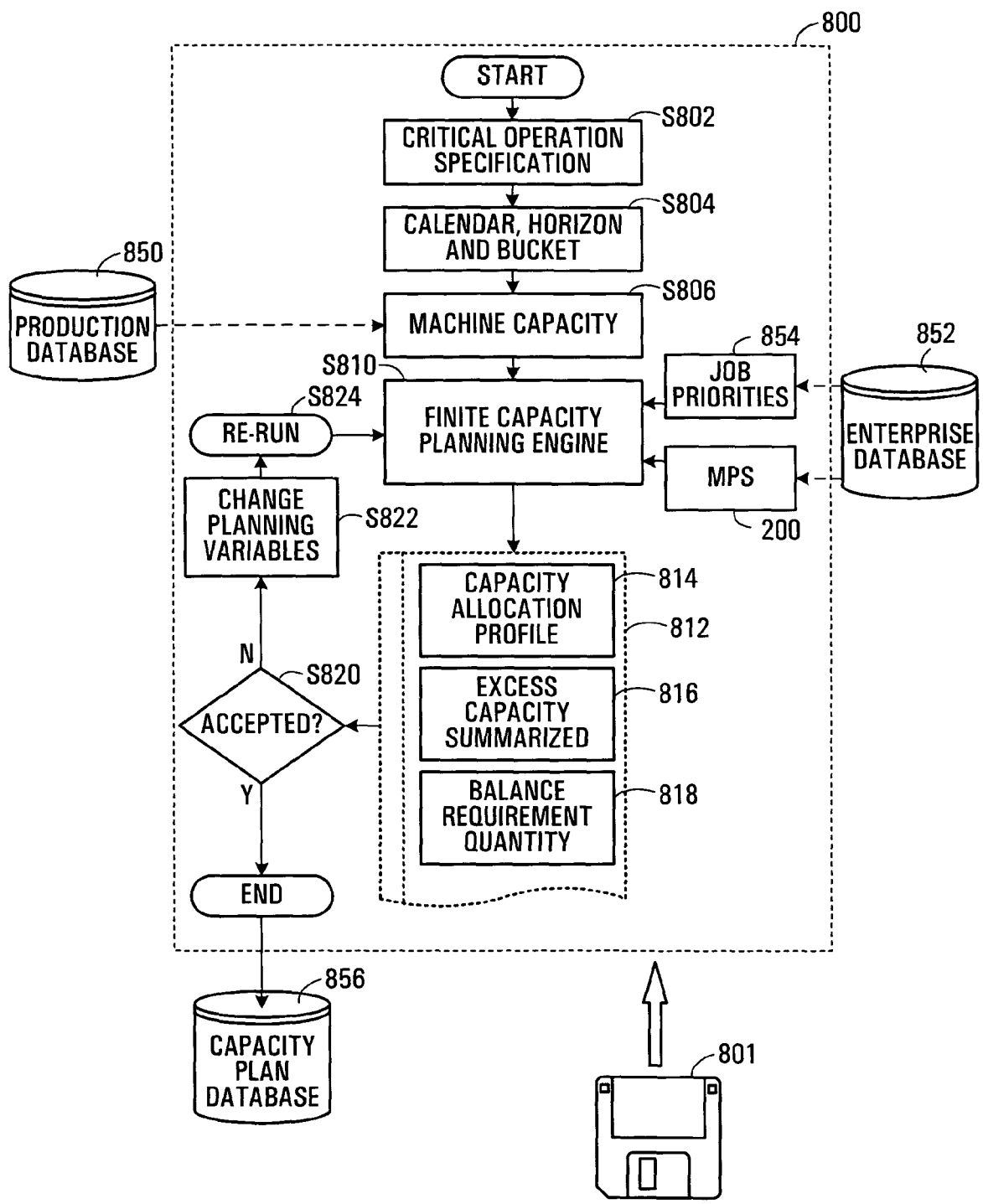
FIG. 8 illustrates high level operation for RCCP.

Operation of the present embodiment for performing RCCP is illustrated in FIGS. 8 and 9.

FIG. 8 illustrates high-level operation of an RCCP system 800 exemplary of an embodiment of the present invention, showing interactions of the RCCP system 800 with an existing enterprise system or systems. RCCP system 800 may comprise a computing device such as a PC having a processor, persistent storage memory storing an operating system such as Microsoft® Windows™ XP, a display, and an input device such as a keyboard and/or mouse (not shown), executing machine-executable code loaded into the system 800 from a machine-readable medium 801, which could be a magnetic or optical disk, a tape, a chip, or another form of primary or secondary storage.

As illustrated in FIG. 8, the RCCP system 800 receives two inputs from, and provides one output to, the enterprise system (s). The first input comprises production facility (i.e. "shop floor") data regarding operations, machines, machine schedules, production lines, and machine preventive maintenance schedules, as downloaded from production database 850. The second input comprises enterprise planning data including MPS 200 and job priority information 854, which are downloaded from an enterprise database 852. The output is a rough-cut capacity plan result generated by the system 800, which may be uploaded to a capacity plan database 856 in the enterprise system(s). The receiving of inputs from, and provision of output to, an enterprise system or systems may be performed automatically, without any human intervention, so as to eliminate the need for data entry and to promote data consistency among the various systems. Alternatively, the inputs could be provided by, and the output could be provided to, a user, e.g., by way of a Graphical User Interface (GUI) (not illustrated).

Referring to the blocks within the RCCP system 800, initially critical operations are specified (S802). A critical operation is an operation associated with a job that is more important than other operations associated with that job, at least for purposes of RCCP. It may be desirable to target a few critical operations initially rather than the complete list of operations specified in the product routing for the purpose of rough-cut capacity planning (e.g. it may not be desired to waste time and effort examining operations for which ample available capacity exists). Therefore, less critical operations may be "turned off" during successive capacity planning runs for "what-if" simulation purposes.

Next, the desired planning time interval is specified (S804), and the available machine capacity (in units of time) during that period is computed (S806) for each machine. In the present example, the desired planning time interval is specified to be week 6 of the production year, e.g. by way of a GUI of the system 800 (not illustrated). The computation of available machine capacity entails examination of a machine timeline similar to timeline 320 (FIGS. 3 and 4) for each machine of the production facility 100 (FIG. 1). As previously described, each timeline indicates when the associated machine is available and when it is unavailable. The timelines may also reflect earlier allocation of the associated machine for processing jobs for which RCCP processing as described herein has already been completed. As will be appreciated, machine timelines will be updated dynamically to reflect allocation of timeslots as the machine is allocated to process one or more jobs.

Figure 9A:
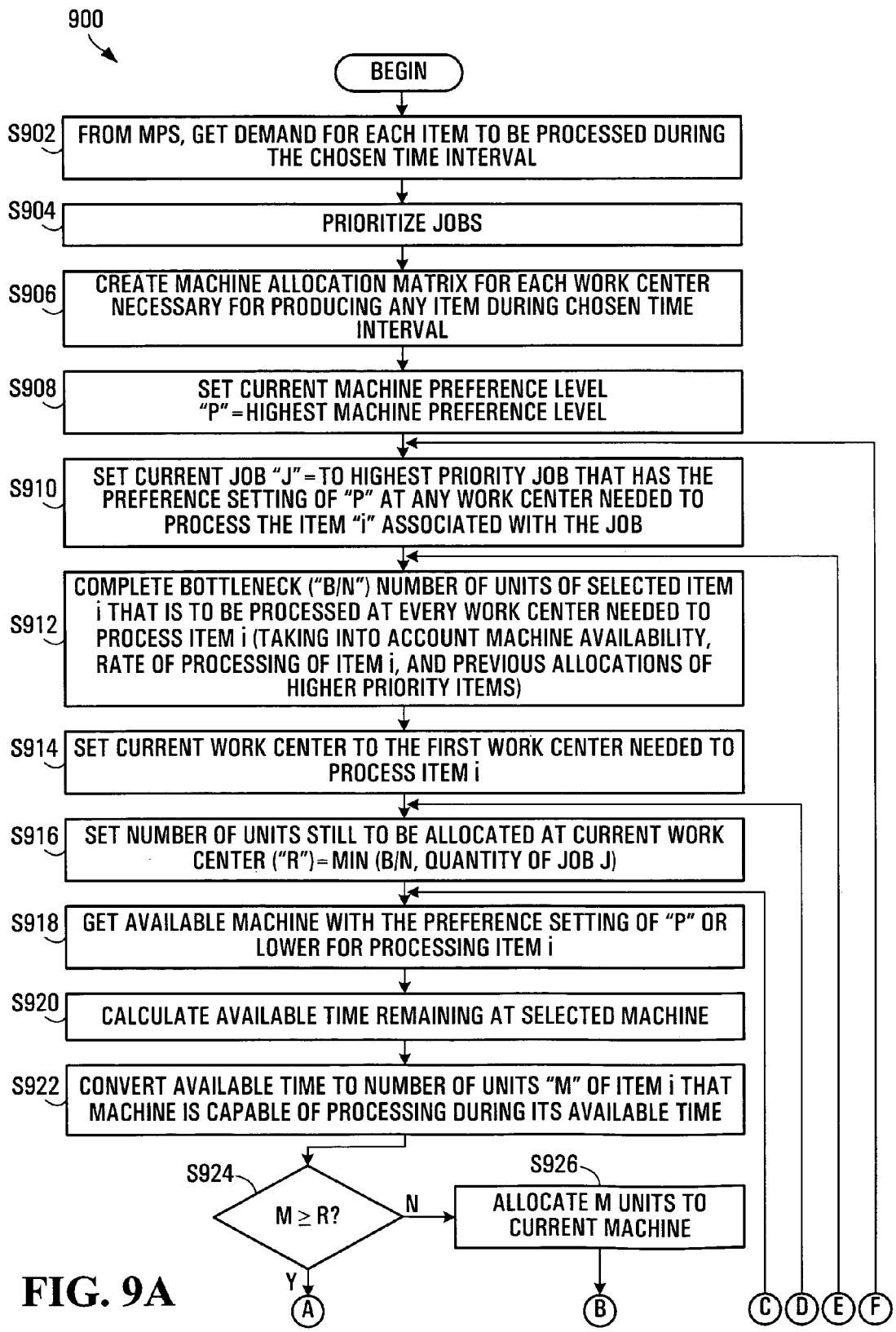
FIGS. 9A and 9B illustrate operation for RCCP in greater detail.
Figure 9B:
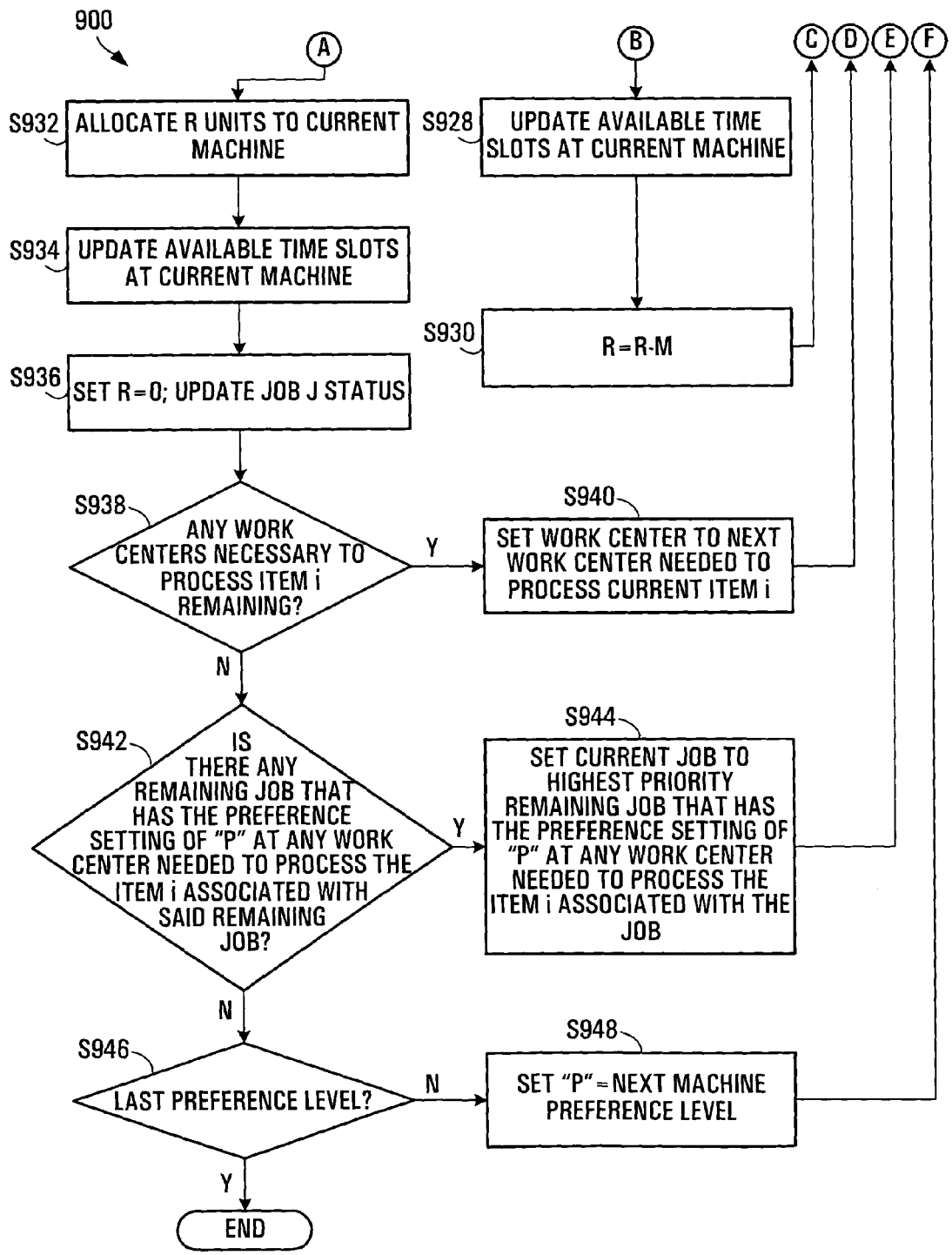

The system 800 next performs rough-cut capacity planning (S810) using job priority information 854, MPS 200, and the machine capacity information determined in S806, resulting in the generation of an RCCP result 814. The generation of an RCCP result 814 as performed in S810 is illustrated in FIGS. 9A and 9B, which are described below. The generated plan 814 may for example consist of a machine allocation map or "item-to-machine" matrix.

After the rough-cut capacity plan 814 has been generated, it be used to generate reports (or "summaries") 816 or 818 in which any excess or shortfall in capacity is indicated (respectively). For example, excess machine capacity for each operation may be summarized in the form of number of unallocated machine hours in summary 816; alternatively, any capacity requirements that could not be fulfilled may be summarized in the form of quantity and machine hours required in summary 818. The reports may be displayed on a display of the RCCP system 800 or printed in hard copy.

The generated tentative rough-cut capacity plan 814 may be either accepted or rejected (S820). If it is accepted, the plan 814 may be uploaded to a capacity planning database 856 of the enterprise system. If the plan 814 is rejected, planning variables may be changed (S822) and the operation re-run (S824). Changing planning variables may for example entail increasing or decreasing working shift duration or adjusting the machine allocation preferences of matrix 700 (FIG. 7) to address a capacity shortage. The latter may be achieved simply by substituting one set of machine allocation preferences 618 for a previously used set 600 (FIG. 6). The changing of planning variables may represent "what-if" analyses in which planning variables are manipulated in order to assess impact upon the capacity planning result. Alternatively, changing of planning variables may constitute manipulation of an MPS 200 in terms of quantity and product mix for purposes of identifying an optimal compromise between various departments of the enterprise performing RCCP, including sales, marketing, finance and production for example.

FIGS. 9A and 9B illustrate operation 900 for performing RCCP according to the present embodiment. The operation 900 illustrated in FIGS. 9A and 9B is the core of the rough-cut capacity planning performed by the present embodiment.

Initially, the demand for each item to be processed during a current time planning time interval is obtained (S902, FIG. 9A). This may be achieved by reading, from MPS 200 (FIG. 2), the quantities of items (column 200-B) desired for each item to be processed (column 200-A) during the chosen planning time interval. The jobs of MPS 200 are then sorted in order of job priority (S904). Sorting may be performed based on item priority followed by customer priority (to break any "ties"). Sorting may not be necessary if the jobs are already listed in order of job priority, as in MPS 200.

Next, machine allocation chain matrix 700 (FIG. 7) is generated, using (sorted) job priority information from MPS 200 and the machine capacity matrices 620 (FIG. 6). It will be appreciated that the order of machines in the individual machine allocation chains of matrix 700 is determined by the machine allocation preferences specified in matrices 610 and 614 (FIG. 6).

Operation 900 then enters a first, outermost loop in which a current machine preference level is set (S908). Initially the current machine preference level is set to the highest machine preference level (i.e. MUST).

Thereafter, operation 900 enters a second loop in which a current job is selected (S910). The job that is selected as the current job is the highest priority job having an operation associated with a work center which has at least one available machine whose preference level for processing the item associated with the job matches the current machine preference level (i.e. MUST). Operation S910 for selecting a current job may be broken into a series of steps (not expressly illustrated).

In a first step, all jobs having an operation associated with a work center which has at least one machine having a preference level MUST for processing the item associated with the job are identified. Identification is performed through examination of the matrix 610 (FIG. 6). In the present example, only one job PkgA28~MAX is identified, since job PkgA28~MAX is the only job for which the machine preference level MUST has been specified for processing the item "PkgA28~MAX" for any machine (specifically, for machine MC003, as shown in machine allocation chain 700-1).

In a second step, the machine timelines corresponding to any machines having the preferred level MUST identified in the first step are examined to determine whether the machine has any remaining unallocated machine time (i.e. to confirm that the machine is available) during the relevant time interval. Of the jobs identified in the first step, those jobs having an operation associated with a work center, which has at least one MUST machine for the relevant item for which available time is found to exist are referred to as "candidate jobs". In the present example, only job PkgA28~MAX is determined to be a candidate job.

In a third step, the highest priority job of the candidate jobs is selected as the "current job". In the present example, job PkgA28~MAX may automatically be deemed the current job, because no other candidate jobs exist. The item associated with the selected job (i.e. "PkgA28~MAX") is referred to as the "selected item".

Subsequently, operation 900 enters a third loop in which machine capacity is allocated to the current job across all work centers. Initially, the bottleneck number of units of the selected item that is capable of being processed across the work centers 110, 120 is determined (S912). For a selected job, the bottleneck is the maximum number of units of the selected item that the production facility 100 is capable of producing during the relevant planning time interval, due to limitations in availability or processing rate at one or more machines at any work center necessary to process the units. As will be appreciated, the machine preference levels specified for each job and for each machine will influence the determined bottleneck number of units.

Operation S912 for determining a bottleneck number of units may be performed in two steps (neither being expressly illustrated).

In first step, a calculation is performed, for each work center needed to process the item, to determine the maximum number of units of the selected item that the work center is capable of processing during the relevant planning time interval. This calculation takes into consideration, for each machine having the current preference level or a lower preference level in respect of the selected item, the available time remaining during the planning time interval and the processing rate of the machine for processing the selected item. The calculation may be performed according to equation (1):

$$\text{Max\_No\_Units}_{i,k}(\delta, p) = \sum_{m=1}^{M_k} \text{Avail\_Machine\_Time}_m(\delta) \times \text{Proc\_Rate}_{m,i} \times \lambda_{m,i}(p) \quad (1)$$

Where:
Max_NO_Units$_{i,k}$ ($\delta$, p)=Maximum number of units of item i that work center k is capable of processing during planning time interval $\delta$ with the proviso that only machines of machine preference level p or lower may be used to process the items
k=Current work center
$\delta$=Current planning time interval
i=Current item
p=Machine preference level
$M_k$=Number of machines at current work center k
Avail_Machine_Time$_m$($\delta$)=Time available at machine m during planning time interval $\delta$ taking into account any scheduled down times and previous allocation to other items
Proc_Rate$_{m,i}$=Rate at which machine m processes items i
$\lambda_{m,i}$(p)=1 for machines m having a machine preference level p or lower in respect of item i, and 0 otherwise In the present embodiment, the Avail_Machine_Time$_m$($\delta$) for a machine m may be determined by examining the timeline associated with machine m. For example, to determine Avail_Machine_Time$_m$($\delta$) for machine MC003 for week 6, all available time slots of the timeline corresponding to that machine would be summed, to provide a total number of hours that machine MC003 is still available during week 6.

The processing rate Proc_Rate$_{m,i}$ at which a machine m processes the selected item i is determined from the machine capacity matrices 620 (FIG. 6). For example, the processing rate for processing item "PkgA28~MAX" with the machine MC003 is 300 units/hour, as illustrated in the appropriate column of row 622-2 of matrix 622 (FIG. 6).

The value of $\lambda_{m,i}$ (p) is 1 for machines m having the current machine preference level or lower in respect of the selected item i, and 0 otherwise. This term reflects the fact that only machines having the current machine preference level or lower are considered in equation (1), so that RCCP will account for the planning preferences specified by a planner.

Using equation (1), the Max_NO_Units$_{i,k}$ ($\delta$, p) value may be computed for each work center needed to process the selected item, and the results stored. In the present example, the calculation would be performed at each work center 110 and 120, since both work centers 110 and 120 are assumed to be necessary for processing the items associated with each job identified in the machine allocation chain matrix 700 (FIG. 7) (e.g., these work centers may be associated with critical operations for capacity planning for the item in question, with other operations needed to process the item being less critical).

In a second step, the minimum one of the Max_NO_Units$_{i,k}$ ($\delta$, p) values calculated in the first step is selected as the bottleneck value, as illustrated in equation (2):

$$\text{Bottleneck}_i(\delta, p) = \min(\text{Max\_No\_Units}_{i,1}(\delta, p), \quad (2)$$
$$\text{Max\_No\_Units}_{i,2}(\delta, p),$$
$$\text{Max\_No\_Units}_{i,N}(\delta, p))$$

Where:
Bottleneck$_i$ ($\delta$, p) the number of units of the selected item i that is to be processed at every work center k required to process the item, due to limitations at (at least) one of the work centers required to process the item.
Max_NO_Units$_{i,k}$ ($\delta$, p)=Maximum number of units of item i that work center k is capable of processing during planning time interval $\delta$ with the proviso that only machines of machine preference level p or lower may be used to process the items.
N=the number of operations required to process the selected item i.

Thus for example, if work center 110 is capable of producing 10,000 units of item PkgA28~MAX (i.e. if Max_NO_Units (week 6, MUST)=10,000) and work center 120 is capable of producing 5,000 units of item PkgA28~MAX, the bottleneck number will be 5,000. As will be seen, during subsequent RCCP processing, machines will be allocated to process only the bottleneck number of units of item at each work center 110 and 120, despite the fact that some work centers (e.g. work center 110) may be capable of processing more than the bottleneck number of units of the item during the planning time interval.

With the bottleneck number now having been determined, machines are allocated to process the bottleneck number of units of the selected item at each work center needed to process the item in subsequent operation (S914 to S940).

Initially, the "current work center" is set as the first work center needed to process the selected item (S914), which in the present example is work center 110. Thereafter, a value "R" representing the number of units of the selected item still to be allocated to a machine at the current work center (work center 110) is initialized to the lesser of the bottleneck value determined above and the number of items to be processed for the job (i.e. the quantity of the job) (S916).

In operation S918 to S940, machines are allocated to process the number of units of the selected item determined in S916 at the current work center.

Initially, an available machine having either the current machine preference level or a lower preference level for processing the selected item is chosen at the current work center (S918). Machines are selected in decreasing order of preference for the selected item (i.e. machines having higher preference levels for the selected item are chosen before machines having lower preference levels).

Next, the available time remaining at the selected machine is calculated (S920). The available time is then converted to a value M representing a number of units of the selected item that could be processed by the selected machine during the remaining available time (S922). The number M is determined based on the processing rate of the selected machine when processing the selected item, as determined from machine capacity matrices 620 (FIG. 6).

If it is determined that the number of units M of the selected item that the selected machine is capable of processing is greater than or equal to the number of units R still to be allocated at the current work center 110 (S924), this means that no other machines at the current work center will be needed to process the selected item. In this case, sufficient time slots on the selected machine are allocated to process R units of the selected item (S932-FIG. 9B), with the timeline corresponding to the selected machine being updated in the process to reflect the allocation (S934). At this stage the number of units R of the selected item still to be allocated at the current work center 110 is set to zero (S936), and allocation is complete for the current work center 110. The status of the job at the current work center may also be updated to "completed" at this stage.

If, on the other hand, it is determined (in S924) that the number of units M of the selected item that the selected machine is capable of processing is less than the number of units R still to be allocated at the current work center 110, this means that one or more other machines at the current work center 110 will be needed to process the selected item. In this case, sufficient time is allocated on the selected machine to process M units of the selected item (S926), with the timeline corresponding to the selected machine being updated to reflect the allocation (S928, FIG. 9B). The number of units R of the selected item still to be allocated at the current work center 10 is then decremented by M (S930), and operation returns to S918 (FIG. 9A).

After allocation has been completed (i.e. after one or more machines have been allocated to process the lesser of the bottleneck number of units of the selected item or the desired quantity of the selected item) at the current work center, an assessment is made as to whether any further work centers are needed to process the selected item (S938). If the answer is in the affirmative, the current work center is set to the next work center needed to process the selected item (S940), and operation returns to S916 (FIG. 9A). If the answer is in the negative, a further assessment is made as to whether any previously unexamined jobs remain which have an operation associated with a work center having at least one available machine whose preference level for processing the item associated with said previously unexamined job matches the current machine preference level (i.e. MUST) (S942, FIG. 9B).

If the latter assessment is made in the positive, the current job is updated to be the highest priority remaining (as yet unplanned) job having an operation associated with a work center which has at least one available machine whose preference level for processing the item associated with the job matches the current machine preference level (i.e. MUST) (S944). Thereafter, operation returns to S912 (FIG. 9A). It is noted that computation of the bottleneck in S912 now takes into account any allocations in S926 of FIG. 9A or S932 of FIG. 9B (i.e., the available time on certain machines may be less than on the first pass through operation S912 to S944).

If the assessment of S942 (FIG. 9B) is made in the negative, no further as-yet-unplanned jobs remain having an operation associated with a work center which has at least one available machine with a MUST preference level for processing the item associated with the job. In this case, a further assessment is made as to whether any preference levels lower than the current preference level remain and have yet to be considered (S946). If this assessment is made in the positive, the current preference level is lowered to the next lower preference level (e.g. from MUST to DP) (S948), and operation returns to S910 (FIG. 9A). Otherwise, operation 900 terminates.

Referring back to FIG. 7, a shorthand visual representation of an exemplary allocation of jobs which results from execution of operation 900 is illustrated. Each allocation of a machine to an operation (as performed in either of S926 or S932 of FIG. 9) is illustrated by way of an arrow labelled "sp#", where "#" is an integer indicative of the sequence in which the allocation was performed. Each arrow may be referred to as a discrete allocation or "stage". Seven discrete allocations (sp1 to sp7) are illustrated. For example, in a first discrete allocation sp1, 31.67 hrs of available time at machine MC003 is allocated. The result of the seven discrete allocations sp1 to sp7 are illustrated in Gantt chart 702. As shown in the chart 702, multiple machines may be allocated to process a single job.

During operation 900, the RCCP system 800 may maintain a machine allocation map 1000 in system memory for each work center 110, 120. An exemplary machine allocation map 1000 associated with work center 110 is shown in FIG. 10. The rows of map 1000 represent jobs/items while the columns represent machines at work center 110. A machine allocation map for work center 120 would be similar, except it would have only two columns—one for each machine MC701 and MC702 of work center 120.

As shown in FIG. 10, the result of each discrete allocation sp1 to sp7 is illustrated in the cell corresponding to the job and machine for which the allocation was performed. The information in a completed cell, which may serve as the basis for reporting and analysis, includes job status fields 1002 and machine status fields 1010. Job status fields 1002 include an "Assigned qty" field 1004 indicating the number of units of the relevant item that the machine will process and "balance qty" field 1006 indicating the remaining quantity of units the relevant item for which a machine has not yet been allocated. Machine status fields 1010 include a "consumed" field representing the time of the relevant machine which has been allocated as of that discrete allocation, and a "balance time" field representing available time on relevant machine which has not yet been allocated as of that discrete allocation. Machine capacity is represented by a "number of machine" field 1014, which is a value from 0 to 1 representing the fraction of available time at the relevant machine which has been allocated as of that discrete allocation (0 indicating no available time has been allocated, 1 indicating that all available time has been allocated). Upon completion of operation, the machine allocation map may constitute the RCCP result 814.

As described previously, the RCCP result 814 may be used to generate various reports 816 or 818 (FIG. 8). Two exemplary reports 1102 and 1104 are illustrated in greater detail in FIG. 11. The first report 1102, entitled "Shared capacity summary report by product", illustrates the result of the allocation, organized by job. The second report 1104, entitled "Shared capacity summary report by machine", illustrates the result of the allocation, organized by machine. It will be appreciated that both reports 1102 and 1104 are specific to work center/operation 110, and that similar reports could be generated for work center/operation 120.

As will be appreciated by those skilled in the art, modifications to the above-described embodiment can be made without departing from the essence of the invention. For example, although the description of an exemplary embodiment provided above assumes that machines are grouped into work centers of one or more machines, it is not necessary for machines to be grouped into work centers in order for RCCP to be performed as described herein. Moreover, it is possible to employ the present invention to perform RCCP for individual machines, each of which is associated with a distinct operation. For example, this could be achieved if it is assumed that each work center in the above-described embodiment includes only one machine.

In another alternative, the sorting of jobs (S904 of FIG. 9) may be performed solely on the basis of either item priority or customer importance (rather than on a combination of the two), or may even be skipped altogether. Of course, if the jobs are not sorted by priority, the ability of the RCCP system to accommodate high-priority items and/or important customers may be limited.

Other modifications will be apparent to those skilled in the art and, therefore, the invention is defined in the claims.

What is claimed is:

1. A method of assessing a sufficiency of a plurality of work centers for processing a plurality of jobs during a time interval, each work center having a group of machines for performing an operation, each job having a job priority and including one or more operations to be performed upon a set of items associated with the job, the items of the set being like items, each machine having a preference level for processing the items associated with each job, said preference level being one of a range of machine preference levels, the method comprising:
   determining which jobs of said plurality of jobs have an operation that is associated with a work center having an available machine whose preference level for processing the items associated with the job matches a current machine preference level, said current machine preference level having been selected from said range of machine preference levels in decreasing preference order, said determining resulting in a set of candidate jobs;
   selecting a highest priority job from said set of candidate jobs, said selecting resulting in a selected job, the items associated with said selected job being referred to as selected items;
   at each work center associated with an operation of the selected job, allocating one or more machines having either said current machine preference level or a lower machine preference level in respect of the selected items to process a chosen number of units of the selected items, said allocating of machines being performed in decreasing order of machine preference level in respect of the selected items;
   prior to said allocating:
      calculating, for each work center associated with an operation of the selected job, a maximum number of units of the selected items that the work center is capable of processing during said time interval, said calculating being based on availability of machines having said current machine preference level or a lower machine preference level in respect of the selected items and on a processing rate of said machines when processing the selected items, said calculating resulting in a set of numbers, each of said numbers being a maximum number of units capable of being processed by a work center; and
      choosing a minimum value from said set of numbers, said minimum value defining a bottleneck number of units of the selected items to be processed during the time interval; and
   outputting a rough-cut capacity plan indicative of said allocating,
   wherein the machine preference level of each machine for processing the items associated with a job is dependent upon the items to be processed,
   and wherein said chosen number of units is said bottleneck number of units.

2. The method of claim 1 further comprising, prior to said determining, identifying jobs from said plurality of jobs for which no machine has yet been allocated to perform any of the one or more operations associated with the job, said identifying resulting in identified jobs, and wherein said determining is limited to said identified jobs.

3. The method of claim 2 further comprising repeating said identifying, said determining, said selecting, said calculating, said choosing and said allocating until either a machine has been allocated to perform each operation of each one of said plurality of jobs or until said allocating cannot be performed for an operation of one of said plurality of jobs.

4. The method of claim 1 wherein said job priority is determined based on one or more of an importance of a customer associated with said job, an importance of a product associated with said job, or a deadline for completing said job.

5. The method of claim 1 further comprising processing said items in accordance with said rough-cut capacity plan.

6. A machine-readable medium comprising code which, upon execution by a processor of a computing device, causes said computing device to assess a sufficiency of a plurality of work centers for processing a plurality of jobs during a time interval, each work center having a group of machines for performing an operation, each job having a job priority and including one or more operations to be performed upon a set of items associated with the job, the items of the set being like items, each machine having a preference level for processing the items associated with each job, said preference level being one of a range of machine preference levels, by:
   determining which jobs of said plurality of jobs have an operation that is associated with a work center having an available machine whose preference level for processing the items associated with the job matches a current machine preference level, said current machine preference level having been selected from said range of machine preference levels in decreasing preference order, said determining resulting in a set of candidate jobs;
   selecting a highest priority job from said set of candidate jobs, said selecting resulting in a selected job, the items associated with said selected job being referred to as selected items;
   at each work center associated with an operation of the selected job, allocating one or more machines having either said current machine preference level or a lower machine preference level in respect of the selected items to process a chosen number of units of the selected items, said allocating of machines being performed in decreasing order of machine preference level in respect of the selected items;
   prior to said allocating:
      calculating, for each work center associated with an operation of the selected job, a maximum number of units of the selected items that the work center is capable of processing during said time interval, said calculating being based on availability of machines having said current machine preference level or a lower machine preference level in respect of the selected items and on a processing rate of said machines when processing the selected items, said calculating resulting in a set of numbers, each of said numbers being a maximum number of units capable of being processed by a work center; and choosing a minimum value from said set of numbers, said minimum value defining a bottleneck number of units of the selected items to be processed during the time interval; and outputting a rough-cut capacity plan indicative of said allocating, wherein the machine preference level of each machine for processing the items associated with a job is dependent upon the items to be processed, and wherein said chosen number of units is said bottleneck number of units.

7. The machine-readable medium of claim 6 further comprising code which, upon execution by said processor of said computing device, causes said device to, prior to said determining, identify jobs from said plurality of jobs for which no machine has yet been allocated to perform any of the one or more operations associated with the job, said identifying resulting in identified jobs, and wherein said code for determining limits said determining to said identified jobs.

8. The machine-readable medium of claim 7 further comprising code which, upon execution by said processor of said computing device, causes said device to repeat said identifying, said determining, said selecting, said calculating, said choosing and said allocating until either a machine has been allocated to perform each operation of each one of said plurality of jobs or until said allocating cannot be performed for an operation of one of said plurality of jobs.

9. The machine-readable medium of claim 6 wherein said job priority is determined based on one or more of an importance of a customer associated with said job, an importance of a product associated with said job, or a deadline for completing said job.

10. A computing device comprising a processor and persistent storage memory in communication with said processor storing machine readable instructions which, upon execution by said processor, direct said device to assess a sufficiency of a plurality of work centers for processing a plurality of jobs during a time interval, each work center having a group of machines for performing an operation, each job having a job priority and including one or more operations to be performed upon a set of items associated with the job, the items of the set being like items, each machine having a preference level for processing the items associated with each job, said preference level being one of a range of machine preference levels, by:

determining which jobs of said plurality of jobs have an operation that is associated with a work center having an available machine whose preference level for processing the items associated with the job matches a current machine preference level, said current machine preference level having been selected from said range of machine preference levels in decreasing preference order, said determining resulting in a set of candidate jobs;

selecting a highest priority job from said set of candidate jobs, said selecting resulting in a selected job, the items associated with said selected job being referred to as selected items; and at each work center associated with an operation of the selected job, allocating one or more machines having either said current machine preference level or a lower machine preference level in respect of the selected items to process a chosen number of units of the selected items, said allocating of machines being performed in decreasing order of machine preference level in respect of the selected items;

prior to said allocating:

calculating, for each work center associated with an operation of the selected job, a maximum number of units of the selected items that the work center is capable of processing during said time interval, said calculating being based on availability of machines having said current machine preference level or a lower machine preference level in respect of the selected items and on a processing rate of said machines when processing the selected items, said calculating resulting in a set of numbers, each of said numbers being a maximum number of units capable of being processed by a work center; and choosing a minimum value from said set of numbers, said minimum value defining a bottleneck number of units of the selected items to be processed during the time interval; and outputting a rough-cut capacity plan indicative of said allocating, wherein the machine preference level of each machine for processing the items associated with a job is dependent upon the items to be processed, and wherein said chosen number of units is said bottleneck number of units.

11. The computing device of claim 10 wherein said code further causes said device to, prior to said determining, identify jobs from said plurality of jobs for which no machine has yet been allocated to perform any of the one or more operations associated with the job, said identifying resulting in identified jobs, and wherein said code for determining limits said determining to said identified jobs.

12. The computing device of claim 11 wherein said code further causes said device to repeat said identifying, said determining, said selecting, said calculating, said choosing and said allocating until either a machine has been allocated to perform each operation of each one of said plurality of jobs or until said allocating cannot be performed for an operation of one of said plurality of jobs.

13. The computing device of claim 10 wherein said job priority is determined based on one or more of an importance of a customer associated with said job, an importance of a product associated with said job, or a deadline for completing said job.

* * * * *